United States Patent
Nachef et al.

(10) Patent No.: US 7,496,193 B2
(45) Date of Patent: Feb. 24, 2009

(54) METHOD FOR THE ADMINISTRATION OF A SUBSCRIBER CARD FOR MOBILE TELEPHONY EQUIPMENT OF THE TYPE WITH AUXILIARY READER AND EMBEDDED SYSTEM FOR THE IMPLEMENTATION OF THE METHOD

(75) Inventors: Armand Nachef, Montigny le Bretonneux (FR); Jerome Arricau, Chaville (FR); Marc Fischer, Neuilly (FR)

(73) Assignee: Axalto SA, Meudon (FR)

( * ) Notice: Subject to any disclaimer, the term of this patent is extended or adjusted under 35 U.S.C. 154(b) by 757 days.

(21) Appl. No.: 10/468,033

(22) PCT Filed: Feb. 19, 2002

(86) PCT No.: PCT/IB02/00499

§ 371 (c)(1),
(2), (4) Date: Aug. 23, 2004

(87) PCT Pub. No.: WO02/067611

PCT Pub. Date: Aug. 29, 2002

(65) Prior Publication Data

US 2005/0207562 A1    Sep. 22, 2005

(30) Foreign Application Priority Data

Feb. 19, 2001   (FR) .................................. 01 02211

(51) Int. Cl.
*H04M 1/00* (2006.01)

(52) U.S. Cl. ................................................ 379/357.01
(58) Field of Classification Search ............. 379/357.01
See application file for complete search history.

(56) References Cited

U.S. PATENT DOCUMENTS

| | | | |
|---|---|---|---|
| 6,631,403 B1 * | 10/2003 | Deutsch et al. ............. | 709/217 |
| 6,714,798 B1 * | 3/2004 | De Kermadec .............. | 455/558 |
| 6,799,155 B1 * | 9/2004 | Lindemann et al. .......... | 703/24 |

* cited by examiner

*Primary Examiner*—Ramnandan Singh
(74) *Attorney, Agent, or Firm*—Pehr Jansson; The Jansson Firm

(57) ABSTRACT

The invention concerns a method for the administration of a subscriber SIM card 3 inserted in the main smartcard reader of a mobile telephone of the type including a second smartcard reader, using an additional administrator smartcard temporarily inserted in this second reader. The administrator smartcard includes at least one specific loader (Ch) applet and one or more files ($f_1$-$f_n$) corresponding to the applets ($A_1$-$A_n$) which can be loaded in the SIM card under the control of the loader (Ch). The administrator card complies with the Sim Toolkit standard. The method can also be used to carry out the deletion, modification and various operations on data or applets ($A_1$-$A_n$) present in the SIM card: display, determination of the memory space, etc.

The invention also concerns an embedded system, more particularly a smartcard, for the implementation of the method.

11 Claims, 4 Drawing Sheets

METHOD FOR THE ADMINISTRATION OF A SUBSCRIBER CARD FOR MOBILE TELEPHONY EQUIPMENT OF THE TYPE WITH AUXILIARY READER AND EMBEDDED SYSTEM FOR THE IMPLEMENTATION OF THE METHOD

FIELD OF THE INVENTION

The invention concerns a method for the administration of an embedded system with electronic chip, more especially a subscriber card for mobile telephony equipment of the type with auxiliary reader.

It is more especially, although not exclusively, intended for mobile telephony terminals complying with the GSM standard, henceforth referred to simply as "mobile telephone". One of the most frequently used standards in Europe is the GSM transmission standard (Global System for Mobile communications, public radiocommunications operating in the 900 MHz band). It must be clearly understood however that the invention is not limited to this standard alone. In particular, it may be used in the standards under development such as GPRS or UTMS.

The invention concerns an embedded system, more particularly an electronic smartcard, for the implementation of the method. Henceforth, for simplification, the name "smartcard" will be used, without limiting in any way whatsoever the scope of the invention.

Some mobile telephones are known as "dual slot" since they include a first smartcard reader, which will henceforth be called the main reader, accepting a card equipped with information processing and storage means, including a functional module known by the abbreviation SIM (Subscriber Identification Module). This smartcard, which will henceforth be called "subscriber" card, may be replaced by a simple electronic module acting as smartcard. If the smartcard has the format known as ID-1, it includes a card as such made from plastic material on which the above-mentioned module with electronic chip is positioned. The assembly respects a certain number of well known standards, whether regarding physical (dimensions, location of the chip, etc.), electrical and/or electronic aspects, which require no further mention. Otherwise, the module alone, in the Plug-in SIM format, can be inserted in the main reader. Generally, the latter simply consists of a chamber fitted with a cover. A back wall has contact studs used to connect the module with the electronic circuits equipping the telephone terminal.

The smartcard inserted in the main reader, or SIM card, stores a certain number of data items concerning the telephone subscription as such the name(s) of the operator(s) that the subscription(s) have been taken out with, subscription, subscriber identification data, etc.), as well as so-called embedded applications. These are, in particular, applets providing access to services present on remote servers, via the telephone network, or just executed locally. The interactive video games displayed on the screen of the mobile telephone are examples of this last category of applications.

To do this, the SIM cards implement the so-called SIM Toolkit technology which complies with standard ETSI 11.14. These cards are programmable. Like all programmable cards, they not only receive commands from the host terminal, i.e. the mobile telephone, but they also transmit commands to this terminal. These commands are known as "proactive". As an illustration, a proactive command called "DISPLAY TEXT", with as parameter, for example, the following text: "Welcome", will request the mobile telephone, under the control of the applet contained in the card, to display the above-mentioned text "Welcome" on its display screen.

Amongst the proactive commands described by the above-mentioned standard ETSI 11.14, some of them are used to activate and then send so-called APDU (Application Protocol Data Unit) commands, i.e. complying with standard ISO 7816, to a second smartcard inserted in a second reader of the mobile equipment, henceforth called the auxiliary reader.

To understand the proactive commands sent by the SIM card, the GSM terminals must of course also comply with the standard ETSI 11.14.

In the known state of the art, the second smartcard generally consists of a credit card, for example a standard bank card. The auxiliary reader generally consists of a traditional smartcard reader which can read a smartcard of this type. In order to do this, it has a slot into which the smartcard is inserted whilst the transaction is being carried out. For example, the transaction could consist of debiting the credit card or the bank card by a certain amount to reload the SIM card with telephone communication units. The second smartcard operates in "slave" mode, since it is under the control of the first smartcard.

In the context of the invention, the term "embedded applications" must be taken in its broadest sense. It normally concerns applets or similar programs, but also includes all types of digital data. For example, the entries of a telephone directory stored in the SIM card or any other data file. Henceforth, the term "digital data" will designate either "applications" (or "programs") or "data or simple data files" stored in the memory means of the SIM card.

We can easily see that for various reasons, it may be useful, or even necessary, to add, delete and/or modify applications or data stored in the SIM card.

It is known that applets need to be added in a SIM card.

BACKGROUND OF THE INVENTION

Generally, a computer (e.g. a traditional microcomputer) is used to load applets. The applet to be loaded is, for example, stored on a hard disk of the computer. A resident program in the computer, known as the "Loader" receives in input a file containing the applet and converts it into a set of commands that it sends to the SIM card.

These commands can be sent in two main ways:
locally, from a smartcard reader connected to the computer.
remotely, for example by using the technology known as Over The Air (O.T.A.) in GSM terminology.

These methods present several disadvantages.

Firstly, the SIM card is inserted in the smartcard reader of the computer used for loading. It can be seen immediately that this methods presents the disadvantage of requiring specific hardware. At least, the subscriber, holder of the SIM card, must physically go to a place where this type of hardware is available.

As regards the second method, it is worth pointing out that digital data is generally transmitted via the Short Message Service (SMS) technology (GSM-Data Service) in compliance with the two standards ETSI 03.40 and ETSI 03.48. Generally, the maximum length of useful in these messages is 160 septets or 140 octets, depending on the applications. Although with current technology, smartcards can only store programs requiring relatively a limited amount of memory, as is the case with the applets, they often come in the form of files occupying about 10 kB. Clearly, it would take about 80 messages to send a file of this length. It must also be pointed out that with transmissions implementing OTA technology, the security and/or reliability rates are not very high. In particular, especially when a set of SIM cards must be updated with data, even identical, the process has to be repeated for each mobile telephone, since the links between a remote server and a mobile telephone are "point to point". Consequently, the above-mentioned method is, in practice, extremely complicated and possibly even impossible to implement.

Since the mobile telephones concerned by the invention are dual slot type, as pointed out earlier, one possible method could have been to use the auxiliary reader to load applets in the SIM card inserted in the main reader. An obvious solution would in fact be to implement a loader program in the subscriber's SIM card. The code of the applet to be loaded could then be stored in another smartcard which could be inserted in the auxiliary reader.

The loader program in the SIM card could then transmit one or more proactive command(s) in order to read the code of the applet to be loaded. Once the program has read the applet code, it can then load it using a suitable means.

Initially, this method seems to offer advantages:

1) The loader program of the SIM card is compatible with the card itself since stored in it;

2) The auxiliary smartcard containing the applet code does not need to comply with the Sim Toolkit standard.

However, this method presents significant disadvantages:

1) Since the loader program takes up a non-negligible amount of space in the SIM card, there is less space for the applets which have to be stored there. Even though the capacity of the memories used on smartcards has significantly increased over the last few years, it remains relatively limited for this type of application.

2) This solution cannot be considered using the present technology, since:

It is impossible to send loading commands. The commands to be sent by the application to the operating system in the SIM card are in fact specified in the standard ETSI 03.19. Loading commands cannot be sent under this standard.

In addition, the applet cannot request the mobile telephone to send commands to the card it hosts.

The current standards would therefore have be modified in order to consider this type of operation.

It is known from the european patent application EP 0 869 691 a mobile phone in which the SIM card communicates with an external component. The SIM card behaves as a gateway between the external component and the GSM network and/or the mobile phone so that the external component controls completely the mobile phone. The modified functionalities are transferred through applets via the SIM card to the external component.

It is also known from the international patent application WO 00/154530 a system allowing to program a set of selectable optional features into the memory of a cellular telephone independtly of the main program. The systems is constituted of a programmer and a port. The programmer located outside the housing of the telephone sends the set of selectable optional features to the port for storage in the memory.

The invention aims to overcome the disadvantages of the methods and devices of the known state of the art, some of which have just been described.

The purpose of the invention, for a mobile device of type including two card readers, is to define a method for the administration of digital data, applications and/or simple data, stored on a first smartcard, called subscriber or SIM smartcard, inserted in a first smartcard reader, called the main reader, via a second smartcard, called administration card, inserted in a second smartcard reader, called auxiliary smartcard reader.

The method according to the invention can be used not only to add one or more applets in the SIM card, i.e. to load applets, but also provides true management or administration of digital data, applications and/or simple data, stored in it. Apart from loading digital data in the SIM card, the method according to the invention can be used to delete digital data, display it on the screen of the mobile device and modify it. This method can also be used to obtain information concerning various parameters and/or attributes about the said digital data and/or the SIM card as such, for example by displaying the names or statuses of the applets already stored in the SIM card, the memory space available in the SIM card, etc.

The method according to the invention does not involve any modification of the hardware implemented (ordinary telephony equipment can be used) and remains fully compatible with current standards whether regarding the transmissions the smartcards (SIM Toolkit technology) or the communications between the smartcards and the circuits of the mobile device, which invoke APDU standards.

SUMMARY OF THE INVENTION

To do this, according to a first characteristic, an "administrator" smartcard will be used, which implements a specific software module.

It is this specific program module which is used to administer the SIM card.

If the loading function is available, the software module includes at least a loader program and one or more applet codes which can be loaded selectively into the SIM card. Preferably, the loader program consists of an applet. Preferably, this applet and the other applets are programmed in JAVA (registered trademark).

If the subscriber SIM card only stores simple digital data (i.e. no applications), then it does not necessarily need to comply with the SIM Toolkit technology.

The invention also concerns a mobile telephony device to implement the method.

Apart from the numerous possibilities offered by the method and its high flexibility, it must also be pointed out that the administrator card is not a "proprietary" type card. It does not in fact have to be provided by a telephone network operator. In all cases, it can be obtained, for example purchased, from various sources: supermarkets, post offices, etc., or sent through the post. Once the user has simply inserted it in the auxiliary reader; the entire loading process, or more generally the administration process, is carried out automatically (as will be fully detailed below) and/or according to the instructions displayed on the mobile telephone screen.

Once again preferably, the instructions for using the administrator card can be printed on it or displayed on screen when it is inserted in the auxiliary reader, after switching on the mobile telephone.

Still preferably, the administrator card is in ID-1 format, which means that it can be inserted instead of a credit card or a standard bank card.

The main purpose of the invention is therefore to define an administration method for an embedded subscriber system for a mobile telephone device of type including a first embedded system reader, the main reader, designed to take the said subscriber embedded system and a second embedded system reader, the auxiliary reader, the said subscriber embedded system including computer processing and data storage means, the said data possibly including software applications, characterised in that it includes at least the following steps:

initial loading, in the digital data storage means of an additional system, the administration system, of a specific software module, including at least one component consisting of a loader program and at least one digital data file in a first format;

temporary insertion of the said administration embedded system in the said auxiliary embedded system reader;

conversion of the said digital data in the first format into a series of digital data in a second format under the control of the said specific software module; and the selective transfer of at least one series of digital data in the said second format to the said subscriber embedded system and its loading in the said storage means of this embedded system, via the said auxiliary and main embedded system readers, under the control of the said specific software module;

and in that the said transfer is carried out according to a given communication protocol.

The invention also concerns an embedded system for the implementation of the method.

BRIEF DESCRIPTION OF THE DRAWINGS

The invention will now be described in more detail, referring to the attached drawings, amongst which.

DETAILED DESCRIPTION

Henceforth, without limiting in any way whatsoever the scope of the invention, we will consider the preferred application of the invention, unless otherwise specified, i.e. the context of a dual slot mobile telephone complying with the GSM standard.

Figure 1:
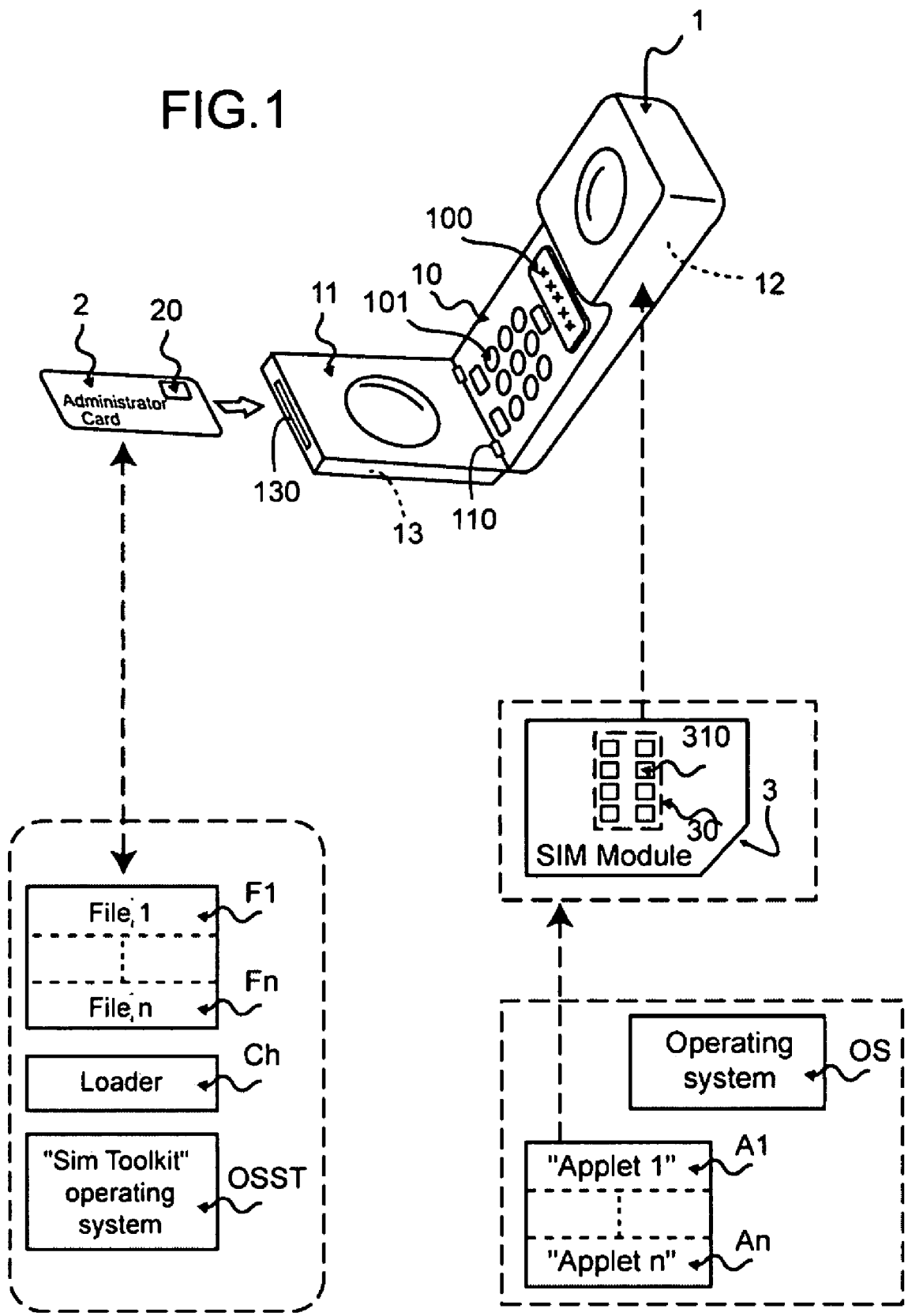
FIG. 1 is a diagrammatic representation of a configuration example for mobile telephone including two smartcard readers with a subscriber SIM card and a smartcard according to the invention.

FIG. 1 is a diagrammatic representation of a mobile telephone 1 and the two smartcards implemented, 2 and 3.

We have assumed that the SIM subscriber card 3 is a module in Plug-in SIM format. As such, this SIM card corresponds to the known state of the art. It includes a support 30 in the above-mentioned Plug-in SIM format, on which is positioned an electronic chip 31 including input-output contact studs, with unique reference 310. The assembly is defined by various standards and/or norms, whether regarding the physical (dimensions, location of the chip, etc.), electrical and/or electronic aspects. The electronic chip includes in particular data processing means in a stored program (microprocessor or microcontroller) and non volatile (ROM, EPROM) and volatile (RAM and various registers) storage means. These various computer resources, also well known, are not shown on FIG. 1.

Apart from programs and digital data directly associated with the telephone transmissions, carried out for example in compliance with the above-mentioned GSM standard, the storage means of the module 3 can store various items of digital data, and especially applets, for example n applets, $A_1$ to $A_n$. As such, this characteristic also corresponds to the known state of the art.

If module 3 stores applets, it must comply with the Sim Toolkit technology so that it can receive commands and transmit proactive commands.

In the example shown on FIG. 1, the mobile telephone 1 includes a main body 10 and an auxiliary body 11, which can be folded back by rotation around an axis 110 at the bottom of the main body 10. The main smartcard reader 12 consists of an internal chamber 12 housing the SIM module 3 (represented on FIG. 1 enlarged and outside its housing). The main body 10 is equipped in particular with a display screen 100, generally liquid crystal type. The auxiliary smartcard reader 13 is located in the auxiliary folding body 11 It communicates with the exterior via a slot 130 in which a smartcard in ID-1 format, and therefore compatible with standard smartcards, bank or credit cards, can be inserted.

The mobile telephone according to the invention therefore remains fully compatible with the norms and standards of the known state of the art. It requires no modifications. In a preferred mode of realisation of the invention, the smartcard used as administration card also complies with the above-mentioned standard ID-1. The auxiliary reader 13 can therefore accept either standard smartcards or smartcards 2 complying with the characteristics of the invention and which are detailed below.

Initially, we assume that the main function of the smartcard 2 is to load new applets in the SIM module 3.

Preferably, the smartcard 2 complies with the Sim Toolkit technology. It can send proactive type commands to the host mobile telephone 1 and read and/or write commands to the files in its Sim Toolkit operating system OSST.

According to a first characteristic of the invention, apart from the above-mentioned Sim Toolkit operating system OSST, the electronic chip 20 of the smartcard 2 contains at least one software module known as the loader Ch and a certain number of files, $f_1$ to $f_n$, capable of being transferred into the SIM module 3, in order to load applications there in addition to any applications already resident (not shown). Preferably, these applications consist of applets, advantageously coded in JAVA (registered trademark) language. In this case, the files, $f_1$ to $f_n$, are advantageously coded according to the CAP file format defined by the Java Card forum (registered trademark).

The loader program Ch itself is also a Sim Toolkit applet. According to a characteristic of the method of the invention, the subscriber's SIM module or card 3 becomes the receiving card. The administrator card 2, according to another characteristic of the method of the invention becomes the main card during the loading, although it is inserted in the auxiliary smartcard reader 13.

In a preferred mode of realisation, due to the fact that the administrator card uses Sim Toolkit technology, it can, unlike the known state of the art, become priority when the mobile telephone 1 is switched on, i.e. it can become "master". The card inserted in the auxiliary reader 13, i.e. the administrator card 2, then takes priority over the SIM module 3: it is the applets of this administrator card 2 which are proposed to the user and not those resident in the SIM module 3 (receiving card).

However, it must be made quite clear that this arrangement is not mandatory. The user could, for example, be requested to press a key or a key combination 101 on the keyboard of the mobile telephone 1 so that the process starts "manually" after this mobile telephone 1 is switched on.

For example, the instructions for use may be supplied independently from the administrator card 2 or printed or engraved on one side of it.

In the preferred mode of realisation, since the administrator card 2 takes priority, an initial interactive menu can be displayed on the screen 100 showing in particular the loader applet Ch installed on this card. Once the user has selected this application, it can read the files present, $f_1$ to $f_n$, so that it can then execute APDU commands on the receiving card, i.e. the SIM module 3, and thereby load the applet(s) corresponding to the files present on the administrator card. These operations are carried out in co-operation with the Sim Toolkit operating system OSST.

More precisely, the card inserted in the auxiliary reader 13, i.e. the administrator card 2, can read the files present on its operating system via one or more traditional APDU commands, such as "READ BINARY". Reading the system files, $f_1$ to $f_n$, enables the administrator card 2 to collect all the information required concerning the applet to be installed on the subscriber's SIM module or card 3.

In addition, the administrator card 2 can open a session in order to access the subscriber's SIM module 3 via the proactive command "POWER ON CARD". When this has been done, the administrator card 2 sends APDU loading commands defined by the standards ETSI 03.48 and ISO/IEC 7816-4 in order to install the applet read previously. The APDU commands are therefore sent to the SIM module via the proactive command "PERFORM CARD APDU". Once the applet has been installed, the administrator card 2 of the auxiliary reader 13 closes the session with the command "POWER OFF CARD". The user can now withdraw the administrator card 2 from the auxiliary reader 13 in order to reconnect on the SIM module 3.

On la FIG. 1, the applets referenced $A_1$ to $A_n$, loaded in addition in the SIM module 3 correspond to files $f_1$ to $f_n$ of the administrator card 2.

All these commands or sessions comply with the usual standards and norms concerning the communication protocol between a card reader and a smartcard. As pointed out above, APDU commands in particular are used. The invention therefore involves no modifications. It should also be pointed out that, once the administrator card 2 according to the invention has been withdrawn, a traditional smartcard, for example a bank card or a credit card, can be inserted in the auxiliary reader 13. In this case, operation corresponds once again to the known state of the art: the smartcard in the auxiliary reader 13 no longer takes priority. It remains under the control of the SIM module or card 3.

Figure 2:
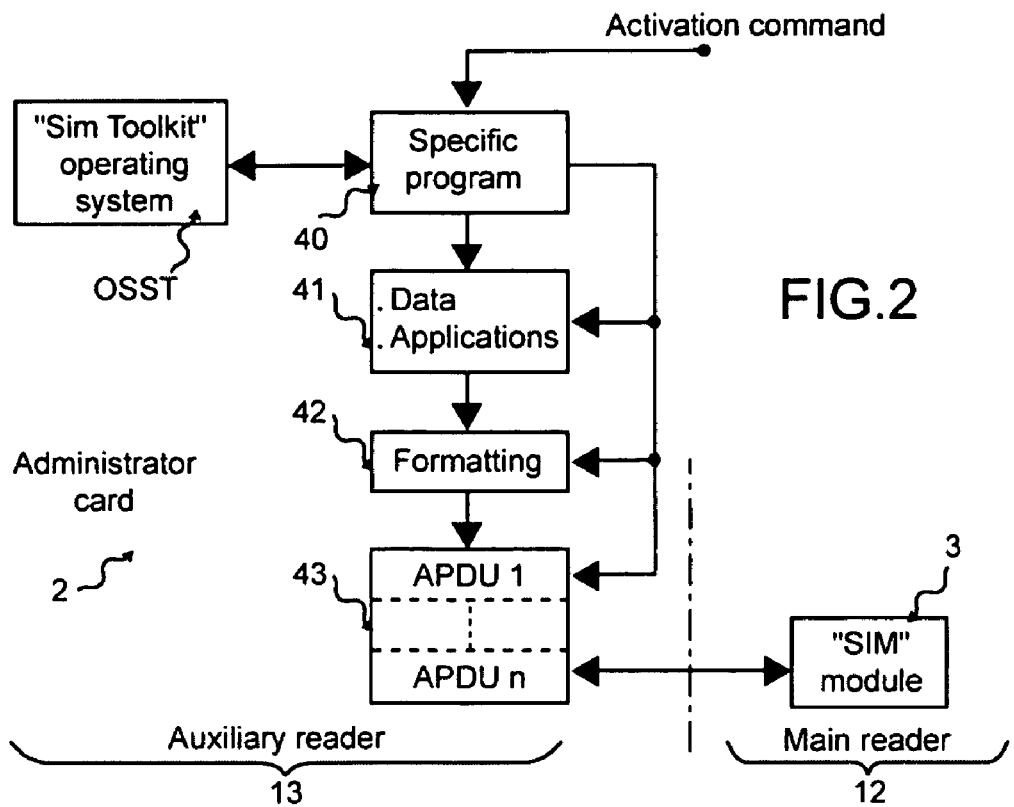
FIG. 2 is a block diagram explaining the main steps and phases of the method according to the invention and the interactions between the components implemented.

FIG. 2 is a block diagram explaining in more detail the main interactions between the various components implemented. The main steps and phases of the method are also shown.

Figure 3:
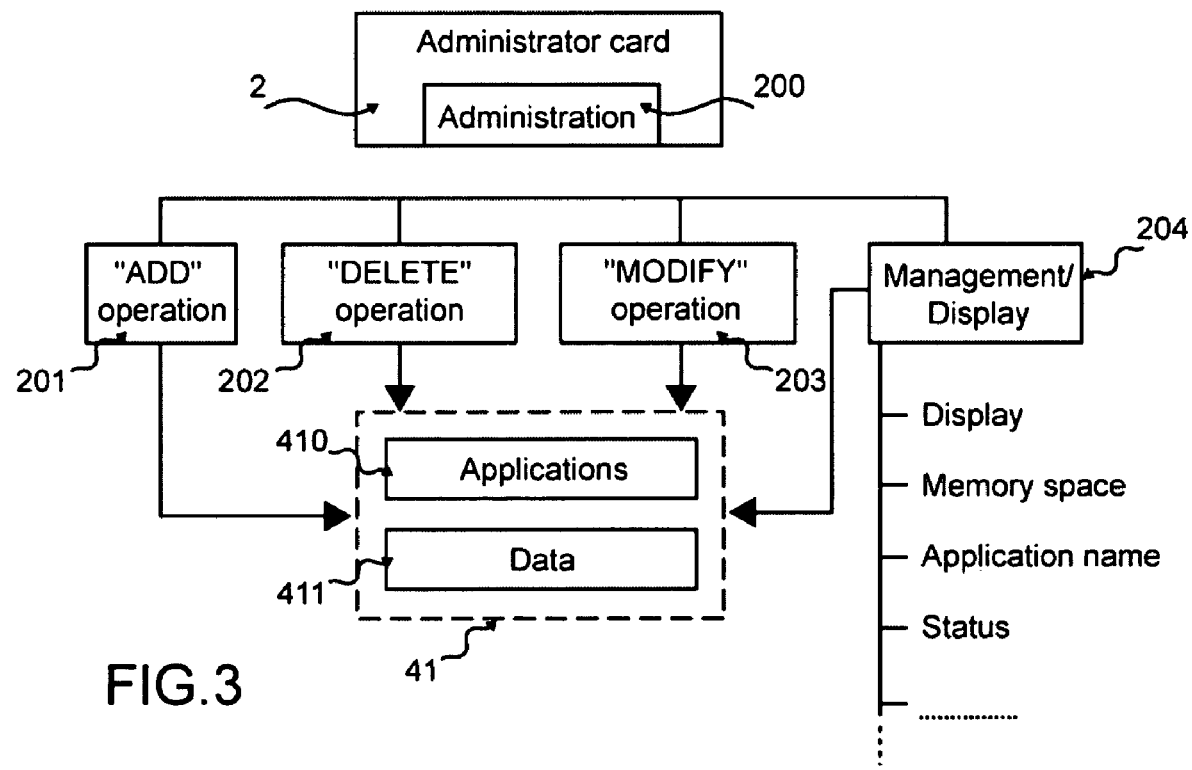
FIG. 3 is a block diagram schematising the main administration operations possible through the use of the method according to the invention.

We also assumed that that the administrator card can be used not only to load one or more applets in the SIM module 3, but also for other operations: deletion, etc., which will be detailed below, especially in reference to FIG. 3. The software module specific to the invention includes several components, under the single reference 40. Preferably, as indicated, it is activated automatically when the mobile telephone 1 is switched on (FIG. 1:1). To do this, a command called "TERMINAL PROFILE" is used, generated by the mobile telephone 1 (FIG. 1) precisely when switching on. The files stored in the administrator card 2 under the single reference 41, are generally associated not only with applets likely to be loaded in the SIM module 3, but also with digital data. For example, this data could consist of entries in the telephone directory. The administration card 2 may also be intended to load data associated with a new telephony operator in the SIM module 3.

A priori, since the standards used for the communications between smartcard and reader implement APDU commands, the data and/or applications 41 cannot be loaded directly into the SIM module 3. A prior operation 42 must be carried out, which will be called formatting, under the specific program command 40. Note that are of course, as with any program during execution, interactions between the operating system OSST and this specific program 40. Once the formatting has been carried out, still under the control of the specific program 40, communication sessions, which may be bidirectional, are set up between the administrator card 2 and the module 3, via the auxiliary reader 13 and main reader 12, using a series of APDU commands (standardised communication protocol).

Consequently, one or more additional applets may be loaded in the SIM module 3.

However, the method according to the invention is not limited to loading applets. As shown by the block diagram on FIG. 3, the card 2 can perform the following main administration operations 200: "addition" 201 (as shown above), as well as "deletion" 202 and "modification" 203. These operations can be carried out on applications (applets) 410 or various items of digital data 411. Lastly, the administrator card 2 can perform administration operations as such, which may be called "management" operations, especially various displays (for example multiple choice interactive menus) on the screen 100 (FIG. 1), search and display of the memory space occupied by the applets present in the SIM module 3, search and display of the name and logical status of these applets, etc.

These operations are all performed under the control of the specific program 40 and implement standard APDU commands and sessions.

Figure 4:
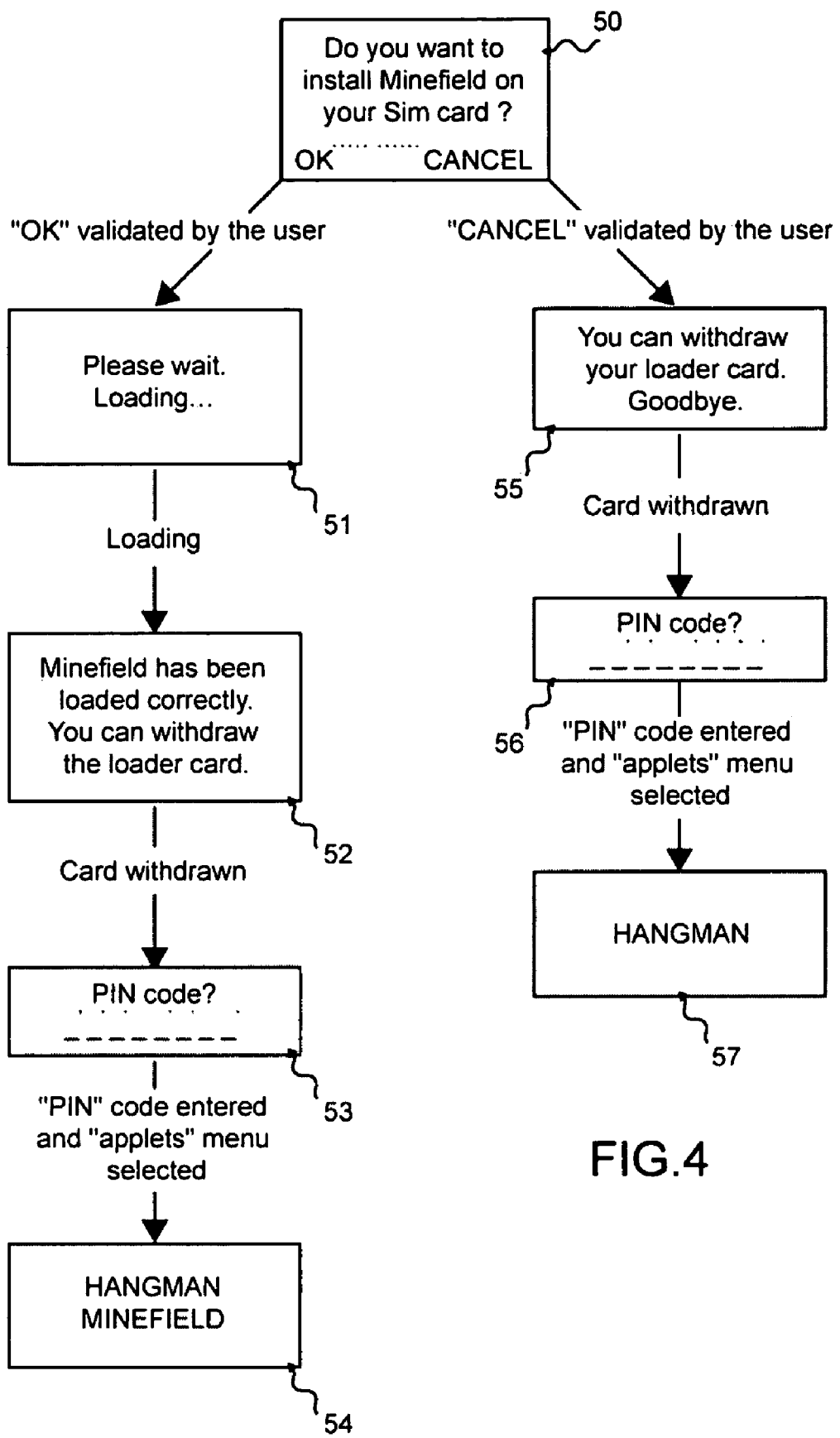
FIG. 4 is a block diagram illustrating a practical example of an applet in the subscriber SIM card, according to the method of the invention.
Figure 5:
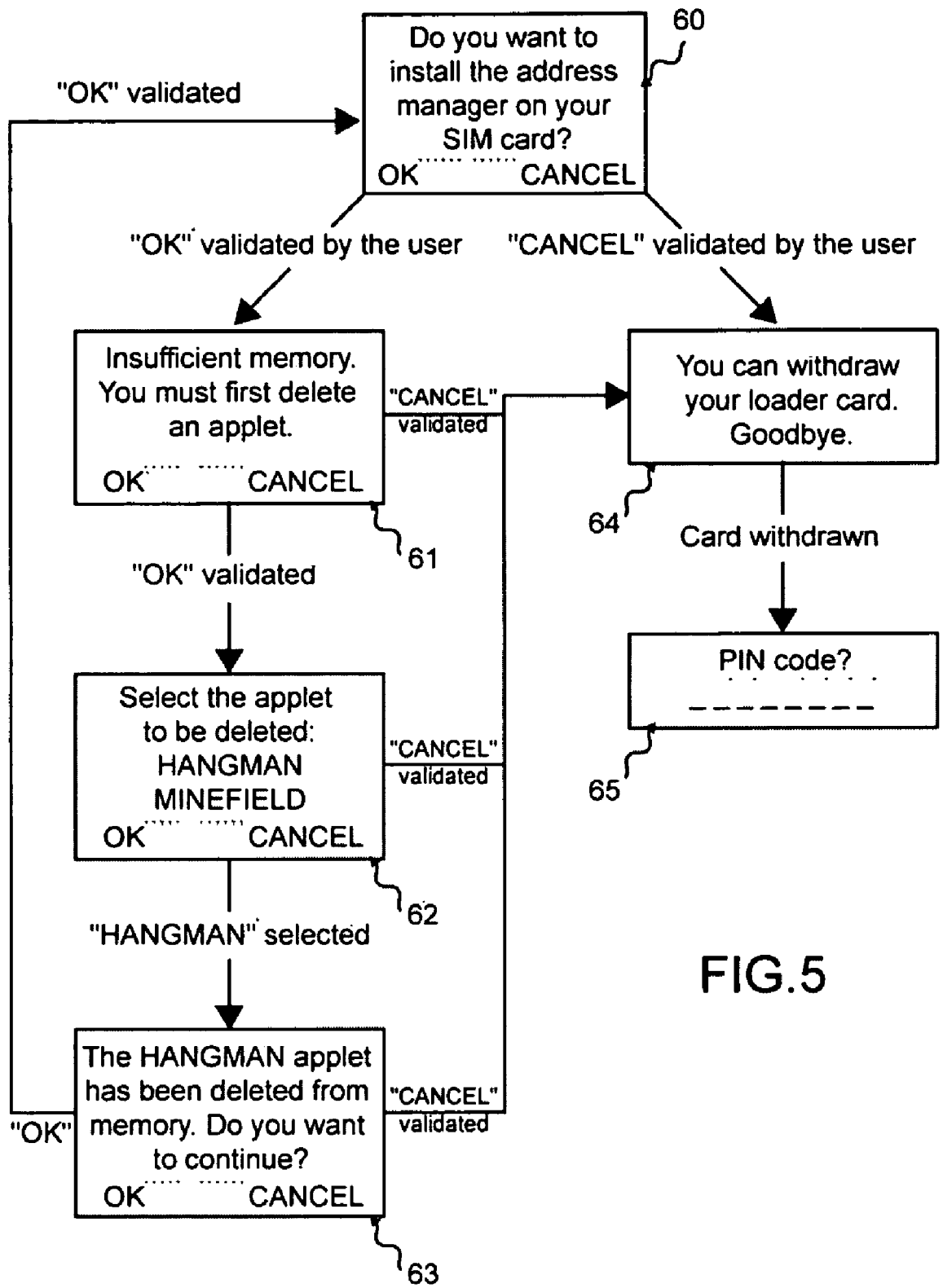
FIG. 5 is a block diagram illustrating a practical example of deleting an applet in the subscriber SIM card, according to the method of the invention.

As an illustration, we will now describe two examples of practical implementation, referring to FIGS. 4 and 5. The first concerns more specifically the selective addition of an applet, which in this case is used for local execution of the well known game called "MINEFIELD". The second concerns more specifically the selective deletion of an applet present in the SIM module 3, after detecting insufficient memory space, in order to add a new applet (an address manager in this case).

EXAMPLE 1

Adding an Applet (FIG. 4)

We assume that a user has already loaded an applet concerning the well known game "HANGMAN" on the SIM module 3 (FIG. 1). He buys an administrator card according to the invention in order to load an extra game, in this game the game "MINEFIELD". When the user inserts the loader card, i.e. the administrator card 2 (FIG. 1) in the auxiliary reader 13 (FIG. 1) with the "Loader" applet Ch (FIG. 1) and the file corresponding to the "MINEFIELD" applet, according to the preferred mode, an initial interactive menu is automatically displayed on the screen 100 (FIG. 1), without the user having to press any key 101 (FIG. 1) on the mobile telephone 1 (FIG. 1). This initial menu indicates to the user the name of the applet that can be loaded and requests whether or not to continue the loading: step 50. The text displayed is as follows: "Do you want to install Minefield on your SIM card? OK CANCEL".

If the user refuses (right hand branch: "CANCEL validated by user"), a new menu prompts the user to withdraw the loader card, i.e. the administrator card 2 (FIG. 1): step 55. The text displayed is as follows: "You can withdraw your loader card. Goodbye". The user withdraws the administrator card 2 from the auxiliary reader 13 (FIG. 1).

Following this operation, the mobile telephone 1 (FIG. 1) switches back over to the SIM module 3 (FIG. 1) and requests the user's PIN code (Personal Identifier Number): step 56.

After entering a correct PIN code, the user can use the SIM module or card 3 again and select an applet from those already resident, for example the "HANGMAN" applet: step 57.

If the user accepts to load the new applet (left hand branch, "OK" validated by user), the administrator card 2 (FIG. 1) loads the "MINEFIELD" applet on the SIM module 33 (FIG. 1), and informs the user that the operation has been carried out successfully: steps 51 and 52. The following messages are displayed:

step 51: "Please wait. Loading . . . ", and step 52: "Minefield has been loaded correctly. You can withdraw the loader card".

When the user has withdrawn the administrator card 2 (FIG. 1), he is prompted to enter his PIN code: step 53.

After entering a correct PIN code, the user can use the SIM module or card 3 (FIG. 1) again and select an applet from those already resident. After selection of the applet menu the two applets present on the SIM module are displayed: "HANGMAN", previously resident, and "MINEFIELD" which has just been loaded: step 54. He can use this new applet, i.e. execute the game "MINEFIELD" on his mobile telephone 1 (FIG. 1).

EXAMPLE 2

Deleting an Applet (FIG. 5)

We now assume that the user has two applets installed on the SIM module 3 (FIG. 1), for example the above-mentioned "HANGMAN" and "MINEFIELD", and he wants to install an additional applet, for example an "address manager". As before, the user inserts an administrator card 2 (FIG. 1) which has a specific program 40 (FIG. 2), especially including a component to load the "address manager" applet (one of the files 41: FIG. 2).

At step 60, a message is displayed: "Do you want to install the address manager on your SIM card? OK CANCEL".

If the user accepts the option presented (left hand branch, "OK" validated), the specific program 40 (FIG. 2) scans the memory of the SIM module 3 (FIG. 2): step 61.

If there is sufficient memory space left on the SIM module 3 (FIG. 1) for this third applet, the "address manager" applet can be loaded on the SIM module 3 (FIG. 1). The execution of this operation is similar to that which has been described with respect to FIG. 4. Consequently, the corresponding steps will not be described again.

Otherwise, if there is not sufficient memory space, a message is displayed to the user indicating that at least one of the two applets already present must be deleted. In the example described, the message is as follows: "Insufficient memory. You must first delete an applet OK CANCEL".

If the user accepts this possibility ("OK" validated), he is prompted to select one of the applets, in response to the message displayed: "Select the applet to be deleted: HANGMAN or MINEFIELD-OK CANCEL": step 62.

If the user accepts one of the options presented, for example if he selects "HANGMAN", the specific program 40 (FIG. 2) starts a session in order to delete the "HANGMAN" applet.

After deleting one of the applets loaded, the user is prompted to continue the procedure, just as in the previous example (FIG. 4): loop back to step 60. The following message is displayed: "The HANGMAN applet has been deleted from memory. Do you want to continue? OK CANCEL": step 63.

In steps 60, 61, 62 and 63, the user has the possibility of refusing the choice proposed ("CANCEL" validated). The process then continues at step 64. The user is prompted to withdraw the administrator card 2 (FIG. 1) from the auxiliary reader 13 (FIG. 1). The following message is displayed: "You can withdraw your loader card. Goodbye".

The user must then enter his PIN code in order to use the SIM module 3 (FIG. 1): step 65.

After reading the above, it is easy to see that the invention does in fact reach the objectives set.

With the method according to the invention, it is possible in particular to use a standard mobile telephone since no modifications are required to the equipment. It complies fully with current norms and standards. It is therefore fully compatible with the known state of the art.

However, it offers numerous advantages. Not only can it be used to add (load) but also to delete and modify applications and/or digital data, as well as to perform various management operations: display, scanning the SIM memory, etc. It therefore provides true management of the subscriber's SIM card or module.

No other equipment is required, as with certain methods of the known art, since the auxiliary reader of the mobile telephone is used as receiver of the administrator card. Neither does it rely on downloads from remote servers, with the disadvantages inherent to this type of method, which were pointed out in the preamble of this description.

Lastly, the administrator card can be issued by any entity, it is not only a proprietary card issued by a mobile telephone operator. The applications and/or data stored are a priori independent from those specific to the telephony operators. However, the method enables an administrator card issued by a particular operator to be used in order to update its own data or to add a subscription to this operator in the SIM card, or on the contrary to delete it.

The administrator card may be available from various types of point of sale or procurement, or even sent through the post.

The operations possible, especially the loading of additional applets, require no special knowledge. In a preferred mode of realisation, certain operations are fully automatic, in particular the activation of the loader program or, more generally, of the specific program. The following steps are interactive, the user being guided by menu.

However, the invention is of course not limited to only those examples of realisation explicitly described, especially in relation to FIGS. 1 to 5.

In particular the text of the messages displayed was only indicated to describe the method of the invention more clearly. These messages are related to the particular applications (applets) loaded on the administrator card. A priori, any messages would be possible without leaving the scope of the invention.

Similarly, the method according to the invention does not interfere in any way with the technology used for the transmissions: GSM, GPRS or UTMS, for example, since the operations are all carried out locally through the implementation of two readers: the main reader containing the SIM module or card and the auxiliary reader intended to receive a traditional smartcard, for example a bank card.

Moreover, the invention is not exclusively intended for mobile telephony. The invention concerns too for example an administration method for a data processing device as a computer, an organizer, an encoder reader or others.

The invention claimed is:

1. An administration method for an embedded system for a device of a type including a first embedded system reader, the main reader, designed to take the said embedded system and a second embedded system reader, the auxiliary reader, the said embedded system including means for the computer processing and storage of data, wherein it consists of loading in the said storage means of the said embedded system at least one item of digital data contained in an additional embedded system, the administration system, inserted in the said auxiliary embedded system reader, under the control of a specific software module contained in the said additional embedded system.

2. The method according to claim 1, wherein it consists of performing the addition, deletion, modification and management or display of administration operations under the control of the said specific software module.

3. The method according to claim 1, wherein it includes at least the following steps: temporary insertion of the said administration embedded system in the said auxiliary embedded system reader; conversion of the said digital data item(s) in the first format into a series of digital data in a second format under the control of the said specific software module; and the selective transfer of the said digital data item(s) in the said second format to the said embedded system and its loading in the said storage means of this embedded system, via the said auxiliary and main embedded system readers, under the control of the said specific software module.

4. The method according to claim 1, wherein the same administration embedded system becomes "master" on powering up although inserted in the said auxiliary embedded system reader.

5. The method according to claim 1, wherein the said device transmits, on being put into service, a command for automatic activation of the said specific software module and in that, the said device including display means, it initializes the display of an interactive menu on the said display means, enabling a user to select one of the said items of digital data for loading in the said storage means of the said embedded system, guiding the user through the loading operations.

6. The method according to claim 1, wherein the said specific software module and the said digital data item(s) to be loaded in the said storage means of the said embedded system are applets encoded in JAVA (registered trademark) language.

7. The method according to claim 1, wherein the said administration of the said embedded system includes the scanning, under the control of the said specific software module, of its storage means, in order to determine predetermined attributes associated with the said digital data item(s) loaded in these storage means and the display of these attributes on the display means of the said device.

8. The method according to claim 1, wherein it includes an additional step, before the loading, which consists of determining whether the remaining memory space is sufficient to perform the said loading, and, in case of negative result, execution of an additional step which consists of the selective and optional deletion, after the choice by a user of the said device and under the control of the said specific software module, of at least one of the said digital data items, in order to release sufficient memory space to carry out the said loading.

9. The method according to claim 1, wherein the said device is a mobile telephony device, the said embedded system is a subscriber embedded system, the said administration embedded system complies with the so-called SIM Toolkit standard, in that it includes an operating system in compliance with this standard enabling the transmission of at least so-called proactive commands in compliance with standard ETSI 11.14, in that the communication protocol used for the loading complies with standard ISO 7816, including the so-called Application Protocol Data Unit commands, and in that the said proactive commands can be used to activate and send Application Protocol Data Unit commands, in order to set up a communication session between the said administration and subscriber embedded systems, and obtain the said selective transfer of at least one digital data item and their loading in the storage means of the said subscriber embedded system.

10. An embedded system including means for the computer processing and storage of digital data, comprising a storage means having a specific software module, including at least one component consisting of a loader program (Ch) and at least one item of digital data in order to load at least one of the said digital data items in the said storage means of a second embedded system, for a device, having a first embedded reader and an auxiliary reader, when the said system is inserted in the auxiliary reader of the said device.

11. The embedded system according to claim 10, wherein the said specific software module stored in the said storage means of the said administration embedded system and the said digital data item(s) to be loaded in the said storage means of the said embedded system are applets encoded in JAVA (registered trademark).

* * * * *